(12) United States Patent
Sasaki

(10) Patent No.: US 7,876,655 B2
(45) Date of Patent: Jan. 25, 2011

(54) OPTICAL RECORDING MEDIUM AND RECORDING DEVICE FOR THIS OPTICAL RECORDING MEDIUM AND RECORDING METHOD

(75) Inventor: Takashi Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1474 days.

(21) Appl. No.: 10/496,695

(22) PCT Filed: Nov. 13, 2002

(86) PCT No.: PCT/JP02/11854

§ 371 (c)(1),
(2), (4) Date: May 26, 2004

(87) PCT Pub. No.: WO03/046898

PCT Pub. Date: Jun. 5, 2003

(65) Prior Publication Data

US 2005/0078578 A1    Apr. 14, 2005

(30) Foreign Application Priority Data

Nov. 29, 2001    (JP) .............................. 2001-364937

(51) Int. Cl.
*G11B 7/00* (2006.01)
(52) U.S. Cl. .................. 369/47.53; 369/116; 369/275.3
(58) Field of Classification Search ............... 369/47.53
See application file for complete search history.

(56) References Cited

U.S. PATENT DOCUMENTS 5,513,166 A * 4/1996 Tokumitsu et al. ....... 369/53.15
6,052,347 A * 4/2000 Miyata ..................... 369/47.53
6,711,107 B2 * 3/2004 Chao et al. ............... 369/47.52
6,937,548 B2 * 8/2005 Hsiao et al. .............. 369/47.53
6,963,525 B2 * 11/2005 Honda ..................... 369/47.53
7,061,839 B2 * 6/2006 Itonaga et al. ............ 369/47.35
2002/0152353 A1 * 10/2002 Fan et al. ..................... 711/112
2003/0036861 A1 * 2/2003 Matsumoto ................. 702/60
2003/0185120 A1 * 10/2003 Morozumi et al. ........ 369/47.52

FOREIGN PATENT DOCUMENTS

| JP | 62-285258 | | 12/1987 |
| JP | 2-61834 | | 3/1990 |
| JP | 2-128326 | | 5/1990 |
| JP | 7-73470 | | 3/1995 |
| JP | 9-288825 | | 11/1997 |
| JP | 9-288827 | | 11/1997 |
| JP | 09288827 A | * | 11/1997 |
| JP | 2001-307334 | | 11/2001 |

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, L.L.P.

(57) ABSTRACT

In the present invention, in order to permit recording operation of data by optimum recording power even at any recording position of inner circumference and outer circumference of an optical disc (1), PCAs (Power Calibration Areas) serving as a trial write area for adjusting recording power of laser beams are respectively provided at the inner circumferential side and the outer circumferential side of the optical disc (1) in the state where program area is put therebetween. In recording data into the program area of the optical disc (1), one PCA near from the recording position of data is selected to perform trial write operation to set write power of laser beams on the basis of trial write data to thereby permit recording operation of data at optimum laser power.

8 Claims, 13 Drawing Sheets

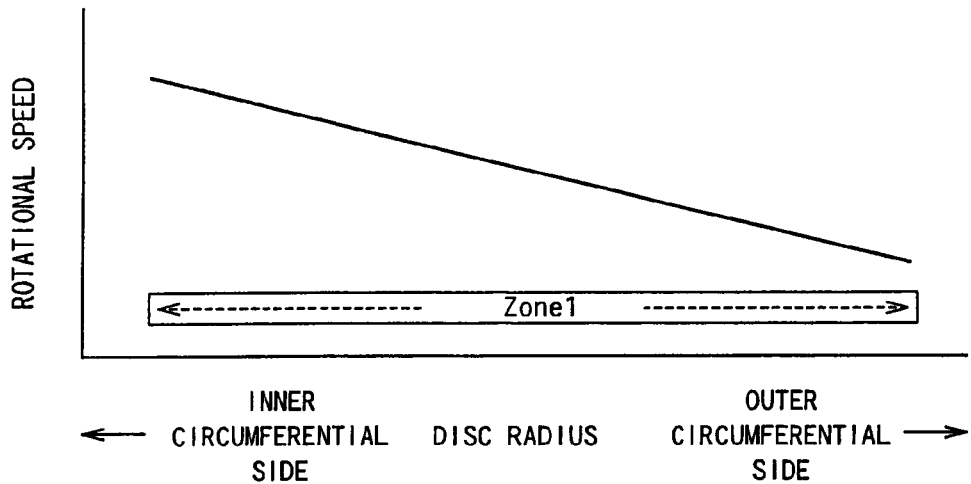
BACKGROUND ART  FIG. 2
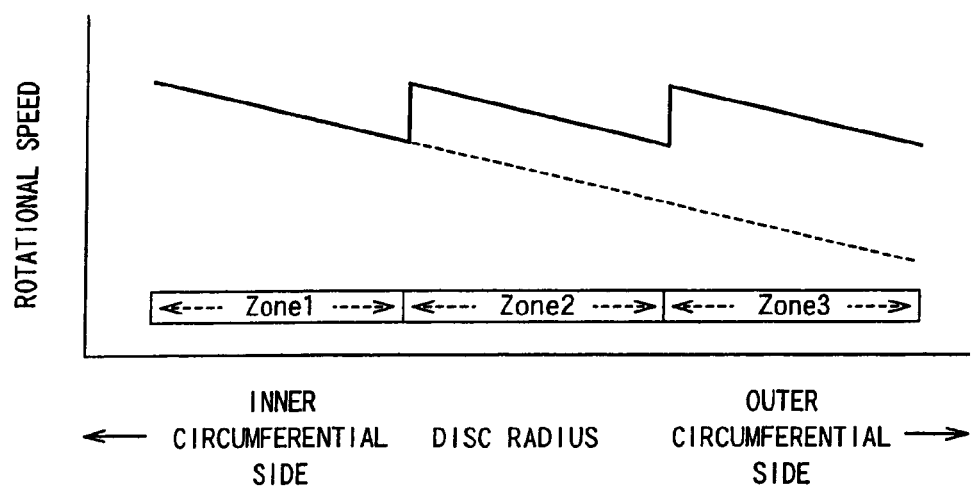
BACKGROUND ART  FIG. 3

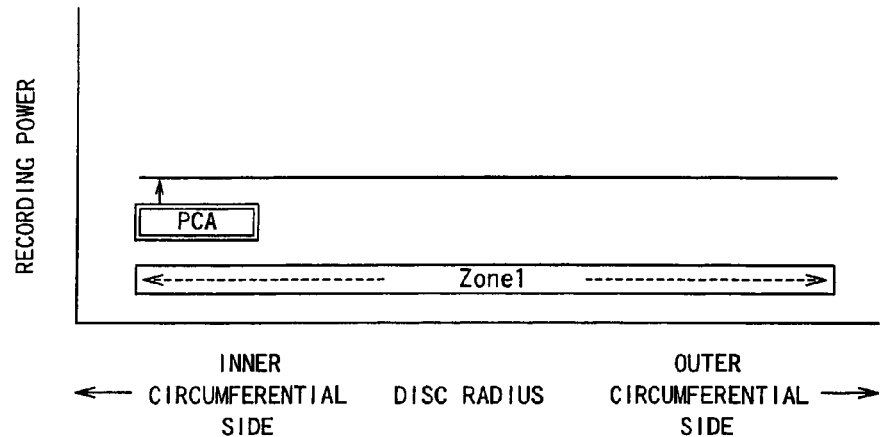
*BACKGROUND ART*  FIG.4
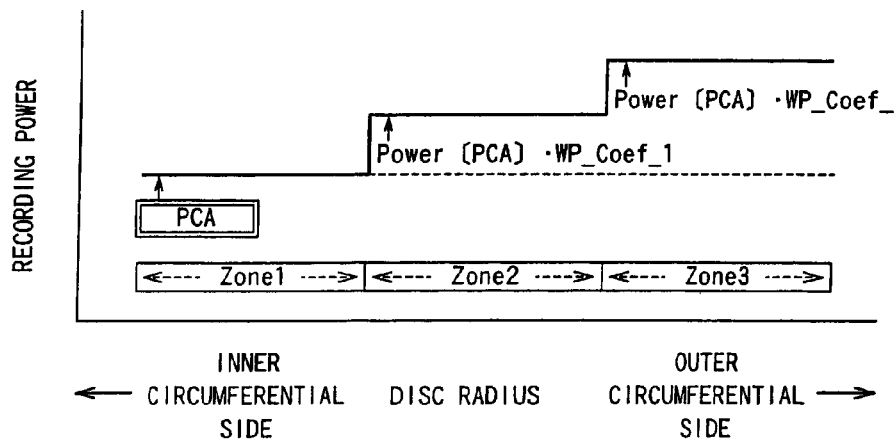
*BACKGROUND ART*  FIG.5

OPTICAL RECORDING MEDIUM AND RECORDING DEVICE FOR THIS OPTICAL RECORDING MEDIUM AND RECORDING METHOD

TECHNICAL FIELD

The present invention relates to a recordable optical recording medium such as optical disc, etc. and a recording apparatus and a recording method which are adapted for recording data by laser beams with respect to such an optical recording medium.

The present invention claims priority of Japanese Patent Application No. 2001-364937, filed on Nov. 29, 2001, the entirety of which is incorporated by reference herein.

BACKGROUND ART

As optical disc by which data can be recorded, CD-R, CD-RW, DVD-R, DVD-RW, DVD+R, DVD+RW, and/or DVD-RAM, etc. are known. CD-R, DVD-R and DVD+R are optical discs of the so-called write once type in which the recording layer consists light reactive coloring matter of the organic system so that only one recording operation can be made. In such optical disc of the write-once type, laser beams are irradiated onto organic coloring matter layer to perform thermal reaction of the organic coloring matter layer by energy of the laser beams so that data are recorded. CD-RW, DVD-RW, DVD+RW and DVD-RAM are optical discs of the phase change type in which the recording layer consists of phase change material so that plural recording operations can be made. In such optical disc of the phase change type, laser beams of a predetermined power are irradiated onto the phase change layer to perform transition of the crystal structure of the phase change layer between crystal state and amorphous state so that data are recorded.

In the case where data are recorded with respect to optical discs of the write-once type or the phase change type, if irradiation energy of laser beams given (applied) onto the recording layer is too large or is too small, distortion takes place in shape or edge of formed recording mark so that reproduction characteristic of the recorded data is deteriorated. For this reason, at the time of recording of data, it is necessary to set power of laser beams to a value suitable for write operation. In laser diode which outputs laser beams, output change by, e.g., wavelength or recording speed, etc. with respect to temperature change is very large, and sensitive characteristics of the recording layer have individual differences every optical discs. In such optical discs of the write-once type or the phase change type, trial write area for adjustment of recording power is provided. The disc drive once performs trial write operation of data in the trial write area at the time of recording of data to determine recording power by which sufficient reproduction characteristic of data can be obtained thereafter to conduct recording operation of data.

The physical format of the conventional CD-R (CD-Recordable) indicated at Orange Book Part2, Vol.2, Ver1.0 is shown in FIG. 1.

As shown in FIG. 1, the CD-R is formed so as to take disc shape having diameter of 120 mm. In the information recording area (information area) of CD-R, there are formed, in order, from the inner circumferential side, XAA (extended ATIP Area), PCA (Power Calibration Area), PMA (Program Memory Area), lead-in area, program area and lead-out area.

In the XAA, there are recorded additional information, e.g., coloring matter information of the recording layer, disc maker ID which has manufactured the CD-R, and/or initial value of recording power, etc.

In the PCA, there is recorded trial write data for adjustment of recording power of laser beams. Namely, the PCA is the area where recording power of laser beams in recording data with respect to the program area is set.

In the PMA, address information required at the time of write-once operation of data is temporarily recorded.

In the lead-in area and the lead-out area, there are recorded TOC (Table Of Contents).

In the program area, there is recorded real data.

As described above, in the conventional CD-R, trial write area for adjustment of recording power of laser beams which is called PCA is provided at the disc inner circumferential side.

In the recordable optical discs of the write-once type or the phase change type, data are recorded by, e.g., CLV (Constant Linear Velocity) control system or zone CLV control system, etc. The CLV control system is the system of recording data onto the disc entire surface by constant linear velocity. For this reason, in the CLV control system, as shown in FIG. 2, disc rotational speed (velocity) with respect to the disc radius position linearly becomes small in accordance with shift toward the outer circumferential side. The zone CLV control system is the system in which the recording area of the disc is divided into plural zones in the radial direction to record or reproduce data at constant linear velocity within respective zones so that linear velocities are different from each other between zones. In this zone CLV, linear velocity in the outer circumferential zone is ordinarily high. In the zone CLV control system, as shown in FIG. 3, for example, the disc rotational speed (velocity) with respect to the disc radius position linearly becomes small in accordance with shift toward the outer circumferential side within the zone.

Meanwhile, in the case where data are recorded onto recordable optical disc such as CD-R or CD-RW, etc., the recording sensitivity should be primarily constant at all times on the disc entire surface. For this reason, the optimum value of recording power with respect to the linear velocity ideally becomes constant irrespective of position in the radial direction.

In the case of recording data by the CLV control system, if the recording sensitivity is constant on the disc entire surface, data can be recorded from the innermost circumference to the outermost circumference by recording power (Power[PCA]) determined by writing trial write data into PCA provided at the inner circumferential side as shown in FIG. 4.

In the case of recording data by the zone CLV control system, if the recording sensitivity is constant on the disc entire surface, data can be recorded, by recording power (Power [PCA]) determined by writing trial write data into PCA provided at the inner circumferential side, with respect to the innermost circumferential zone (ZONE 1) as shown in FIG. 5. With respect to other zones, data can be recorded by recording power obtained by multiplying recording power (Power [PCA]) determined by writing trial write data into PCA provided at the inner circumferential side by correction coefficients with respect to respective zones. For example, in the case where three zones (ZONE1, ZONE2, ZONE3) exist, when correction coefficient with respect to the zone 2 is assumed to be WP_Coef_1 and correction coefficient with respect to the zone 3 is assumed to be WP_Coef_1×WP_Coef_2, recording powers with respect to respective zones can be determined in a manner as described below.

Recording power with respect to the zone 1

Power [z1]=Power [PCA]

Recording power with respect to the zone 2

Power [z2]=Power [PCA]×WP_Coef_1

Recording power with respect to the zone 3

Power [z3]=Power [PCA]×WP_Coef_1×WP_Coef_2

As described above, in recordable optical discs such as CD-R or CD-RW, etc., if there results the ideal state where the recording sensitivity is constant on the disc entire surface, data can be recorded on the basis of recording power determined by writing trial write data with respect to one PCA provided at the inner circumferential side irrespective of position in the radial direction (address position where data are recorded) of the disc.

In practice, the recording sensitivity with respect to position in the radial direction (address) of the disc is not constant by factors as described below. For this reason, the optimum value of recording power is changed by the position in the radial direction (address) of the disc.

1) Mechanical characteristic of drive or optical disc such as skew, plane deviation or aberration 2) Temperature/Humidity change and/or aging change of polycarbonate 3) Coating unevenness of organic coloring matter at the time of spin coat, or sputter unevenness of phase change material at the time of deposition 4) Contraction or expansion of base (substrate) at the time of disc molding 5) Relative tilt angle taking place at integrated type CD/DVD common head in which two laser diodes for CD and DVD are mounted 6) Oscillation wavelength change of laser 7) Drive adjustment unevenness or attachment error Here, the relative tilt angle of 5) refers to relative angle between the optical axis of DVD and the optical axis of CD at optical head common to DVD/CD which is called component head. The component head is caused to be of the configuration comprising two laser diodes of laser diode for DVD and laser diode for CD with respect to one object lens. In such component head common to DVD/CD, speaking ideally, the optical system is designed so that the optical axis of laser beams for CD irradiated from the object lens onto the disc and the optical axis of laser beams for DVD irradiated from the object lens onto the disc are perpendicular to the disc. Namely, design is made so that laser beams are irradiated from the object lens onto the disc in the state where the optical axis of laser beams for CD and the optical axis of laser beams for DVD are in correspondence with each other. However, in practice, the optical axis of laser beams for CD and the optical axis of laser beams for DVD have angle in a relative manner when laser beams are passed through the object lens by influence resulting from unevenness by individual difference of optical parts and/or unevenness of adjustment of the optical axis of respective laser beams for CD and DVD, etc. This angle is called relative tilt angle. In the case where this relative tilt angle is large, light beams are not irradiated in such a manner that either one of optical axes of laser beams for CD, DVD or both optical axes thereof are perpendicular to the disc. As a result, frame aberration, etc. takes place in laser spot. For this reason, recording power of laser beams does not become constant with respect to the disc entire surface so that it changes every position in the radial direction (address) of the disc.

In the case where the optimum value of recording power of laser beams changes in accordance with the position in the radial direction of the disc in a manner as stated above, even if data are recorded onto the disc entire surface by recording power determined by writing trial write data into PCA of the inner circumferential side, reproduction characteristic of recorded data would be deteriorated at recording position remote from the PCA, i.e., at the recording position of the outer circumferential side. For example, in the case of the CLV recording system, the above-described respective factors are greatly influenced according as position becomes close to the outer circumferential side. As a result, differences between recording power determined by writing trial write data into PCA of the inner circumferential side and optimum recording powers at actual respective recording positions become large. In the case of the zone CLV recording system, since recording speed becomes high every zone, differences between the optimum value of recording power of the inner circumferential side and optimum value of recording power of the outer circumferential side are accumulated by the number of zones. As a result, reproduction characteristic of recorded data is further deteriorated.

Particularly, in recent years, realization of high data write speed is being made. In the case where attempt is made to realize such high speed write operation, such error of recording sensitivity that problem does not take place at the conventional low write speed also becomes large to have influence on recording characteristic of data. As a result, when recording power is calculated only by one PCA provided at the inner circumferential side, there is the possibility that data cannot be correctly recorded with respect to the disc entire surface.

DISCLOSURE OF THE INVENTION

An object of the present invention is to provide a novel optical recording medium and a recording apparatus and a recording method with respect to such optical recording medium which can realize recording of data by satisfactory recording characteristic over the entire area of the optical recording medium.

Another object of the present invention is to provide an optical recording medium and a recording apparatus and a recording method with respect to such optical recording medium which can record data by optimum recording power even at both inner and outer circumferential recording positions.

The optical recording medium proposed in order to attain objects as described above at least includes a data recording area where laser beams are irradiated so that data is written, and plural trial write areas where trial write data for adjusting write power of laser beams is written.

The recording apparatus according to the present invention comprises: recording means for irradiating laser beams onto an optical recording medium at least including a data recording area where laser beams are irradiated so that data is written and plural trial write areas where trial write data for adjusting write power of laser beams is written to write the data; and control means adapted so that, in writing data into a data recording area of the optical recording medium, it controls the recording means in a manner to write trial write data into the trial write area nearest from a position where data is written into the data recording area of the plural trial write areas.

Another recording apparatus according to the present invention comprises: recording means for irradiating laser beams onto an optical recording medium at least including a data recording area where laser beams are irradiated so that data is recorded and plural trial write areas where trial write data for adjusting write power of laser beams is written to write the data; and control means adapted so that, in writing data into a data recording area of the optical recording medium, it controls the recording means in a manner to write trial write data into the trial write data nearest from a position where data is written of the plural trial write areas.

A further recording apparatus according to the present invention comprises: recording means for irradiating laser beams onto an optical recording medium at least including a data recording area where laser beams are irradiated so that data is written and plural trial write areas where trial write data for adjusting write power of laser beams is written; and control means adapted so that, in writing data into a data recording area of the optical recording medium, it controls the recording means in a manner to write trial write data into at least two trial write areas or more of the plural trial write areas.

A still further recording apparatus according to the present invention comprises: recording means for irradiating laser beams to record data onto an optical recording medium; and control means for controlling the recording means, wherein, in recording data with respect to the optical recording medium including a data recording area where laser beams are irradiated so that data is written, and plural trial write areas where trial write data for adjustment of recording power of laser beams is written, trial write operation is performed in the state where trial speed for adjusting recording power of laser beams is caused to be high in accordance with shift toward outer circumference of the optical recording medium.

The recording method according to the present invention is directed to a data recording method of irradiating laser beams to record data onto an optical recording medium, wherein, in recording data with respect to the optical recording medium including a data recording area where laser beams are irradiated so that data is written and plural trial write areas where trial write data for judgment of recording power of laser beams is written, trial write operation for adjusting recording power of laser beams is performed within a trial write area nearest from recording position of data.

Another recording method according to the present invention is directed to a data recording method of irradiating laser beams to record data onto an optical recording medium, wherein, in recording data with respect to the optical medium including a data recording area where laser beams are irradiated so that data is written and plural trial write areas where trial write data for adjustment of recording power of laser beams is written, trial write operation for adjusting recording power of laser beams is performed within two trial write areas or more.

A further recording method according to the present invention is directed to a data recording method of irradiating laser beams to record data onto an optical recording medium, wherein, in recording data with respect to the optical recording medium including a data recording area where laser beams are irradiated so that data is written and plural trial write areas where trial write data for adjustment of recording power of laser beams is written, trial write operation is performed in the state where trial write speed for adjusting recording power of laser beams is caused to be high in accordance with shift toward outer circumference of the optical recording medium.

Still more further objects of the present invention and practical merits obtained by the present invention will become more apparent from the description of the embodiments which will be given below with reference to the attached drawings.

BRIEF DESCRIPTION OF THE DRAWINGS

FIG. 2 is a view showing the relationship of rotational speed with respect to disc radius position in the case of the CLV control system.

FIG. 3 is view showing the relationship of rotational speed with respect to disc radius position in the case of the zone CLV control system.

FIG. 4 is a view showing the relationship of recording power of laser beams with respect to disc radius position in the case of the CLV control system.

FIG. 5 is a view showing the relationship of recording power of laser beams with respect to disc radius position in the case of the zone CLV control system.

BEST MODE FOR CARRYING OUT THE INVENTION

Explanation will now be given by taking examples where the present invention is applied to an optical disc in which write-once recording can be made and an optical disc recording/reproducing apparatus adapted for performing recording/reproduction of data with respect to such optical disc.

<Format of Optical Disc>

The optical disc to which the present invention is applied is directed to the optical disc in which improvement has been made with respect to conventional CD-R (CD-Recordable) shown in Orange Book Part2, Vol.1, Ver3.1 and Orange Book Part2, Vol.2, Ver1.0.

The optical disc to which the present invention is applied is a disc-shaped optical recording medium having thickness caused to be 1.2 mm and diameter caused to be 120 mm. Recording tracks are formed in spiral form, and its recording direction is a direction from the inner circumferential side toward the outer circumferential side. The recording capacity has 680 M bytes at the maximum. The optical disc to which the present invention is applied is composed of four layers of, e.g., polycarbonate base (substrate), organic coloring matter layer, reflection layer and overcoat layer. In this optical disc, laser beams of a predetermined power are irradiated onto organic coloring matter layer so that the coloring matter is caused to undergo thermal reaction. As a result, reflection factor changes. Thus, data are recorded. In the optical disc, guide grooves for laser spot which are called pre-groove are provided at the polycarbonate base so that recording tracks are formed. The recording tracks meander in the radial direction in accordance with sinusoidal (sine) wave having a predetermined frequency. Such meandering is called wobbling. At the wobbling component, address information which is called ATIP (Absolute Time In Pre-groove) is modulated. The above-mentioned content is the same as the conventional CD-R (CD-Recordable) shown in Orange Book Part2, Vol.1, Ver3.1 and Orange Book Part2, Vol.2, Ver1.0.

Figure 1:
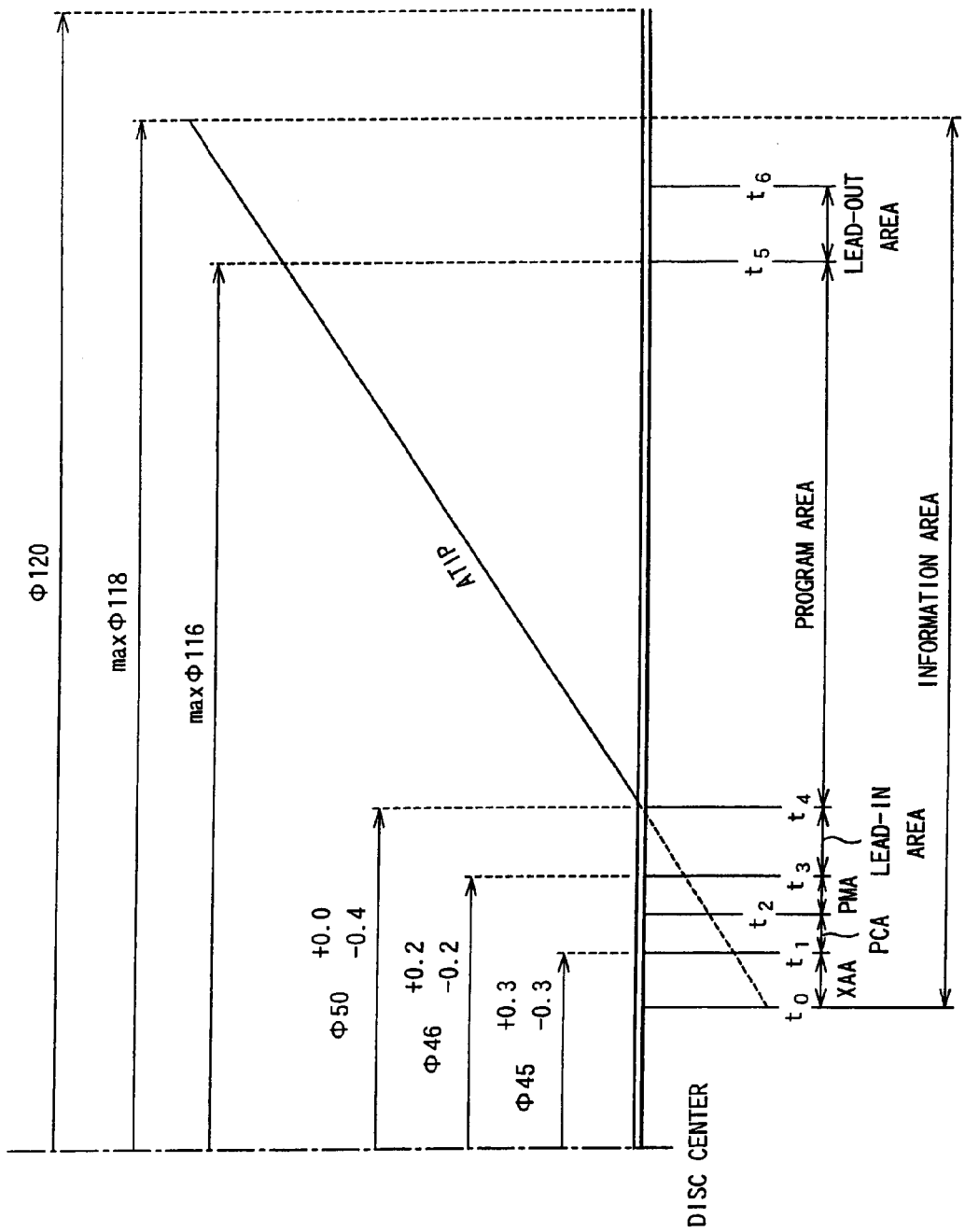
FIG. 1 is a view showing physical format of the conventional CD-R.
Figure 6:
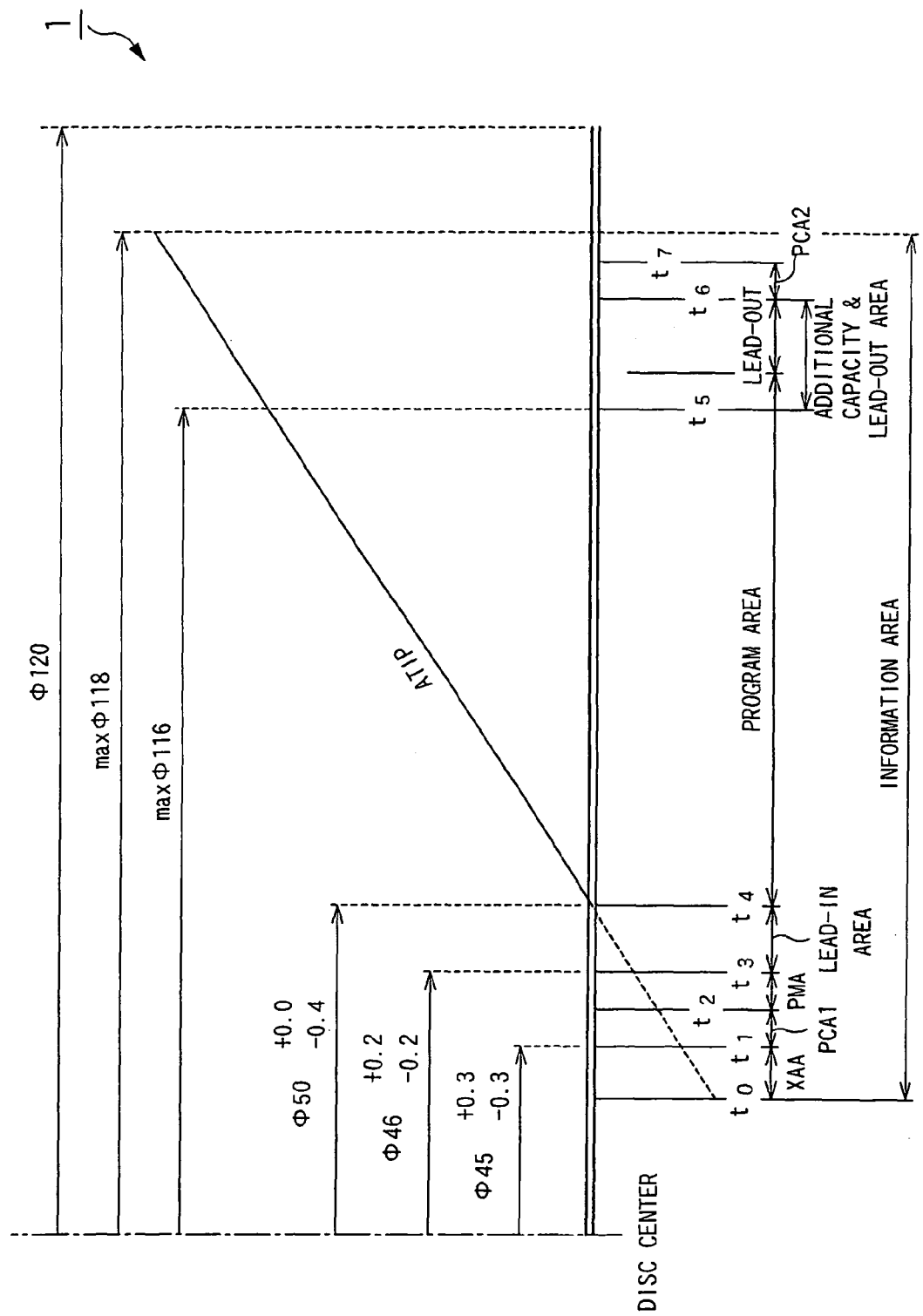
FIG. 6 is a view showing the physical format of optical disc to which the present invention is applied.

The physical format of optical disc 1 to which the present invention has been applied is shown in FIG. 6.

At the optical disc 1, recording tracks are formed in advance by pre-grooves. The area where the recording tracks are formed is called information area.

In the information area, as shown in FIG. 6, there are provided, in order, from the inner circumferential side, XAA (extended ATIP Area), PCA1 (Power Calibration Area 1 which will be called hereinafter inner circumferential side PCA as occasion may demand), PMA (Program Memory Area), lead-in area, program area, additional capacity & lead-out area, and PCA2 (Power Calibration Area 2 which will be called outer circumferential side PCA as occasion may demand).

In the XAA, there are recorded additional information, e.g., coloring matter information of the recording layer, disc maker ID which has manufactured the CD-R and initial value of recording power, etc.

At the inner circumferential side PCA and the outer circumferential PCA, trial write data for adjustment of recording power of laser beams is recorded. Namely, the PCAs are areas where recording power of laser beams in recording data with respect to the program area is set.

In the PMA, address information required at the time of write-once operation of data is temporarily recorded.

In the lead-in area, TOC (Table Of Contents) is recorded.

In the program area, real data is recorded.

The additional capacity & lead-out area consists of additional capacity area, and lead-out area. In the additional capacity area, additional information is recorded. In the lead-out area, TOC is recorded.

The boundary of the outer circumferential side of the information area results in the position of 118 mm at the maximum in terms of diameter. The boundary of the inner circumferential side of the inner circumferential side PCA results in the position of 45 mm (error range +0.3 mm to −0.3 mm) in terms of diameter. The boundary of the inner circumferential side of the lead-in area results in position of 46 mm (error range +0.2 mm to −0.2 mm) in terms of diameter. The boundary of the outer circumferential side of the lead-in area results in the position of 50 mm (error range +0.0 mm to −0.4 mm) in terms of diameter. The boundary of the inner circumferential side of the program area results in the position of 50 mm (error range +0.0 mm to −0.4 mm) in terms of diameter. Namely, that boundary results in boundary position of the outer circumferential side of the lead-in area. The boundary of the outer circumferential side of the program area results in the position of 116 mm at the maximum in terms of diameter. The boundary of the inner circumferential side of the additional capacity & lead-out area results in the position of 116 mm at the maximum in terms of diameter. Namely, that boundary is in correspondence with the boundary position of the outer circumferential side of the program area.

Wobbling is implemented to recording tracks of the information area so that ATIP is included. In the ATIP, there is included address information in which the disc radius position is represented by time information. In this address information, the start position of the program area which is the boundary position of the inner circumferential side of the program area is set at origin time (00:00:00), and times of respective tracks are prescribed with the origin time being as reference. Within the ATIP, information indicating start time (TSL1) of the lead-in area and information indicating start time (TSAL) of the additional capacity & lead-out area are included as additional information.

Figure 7:
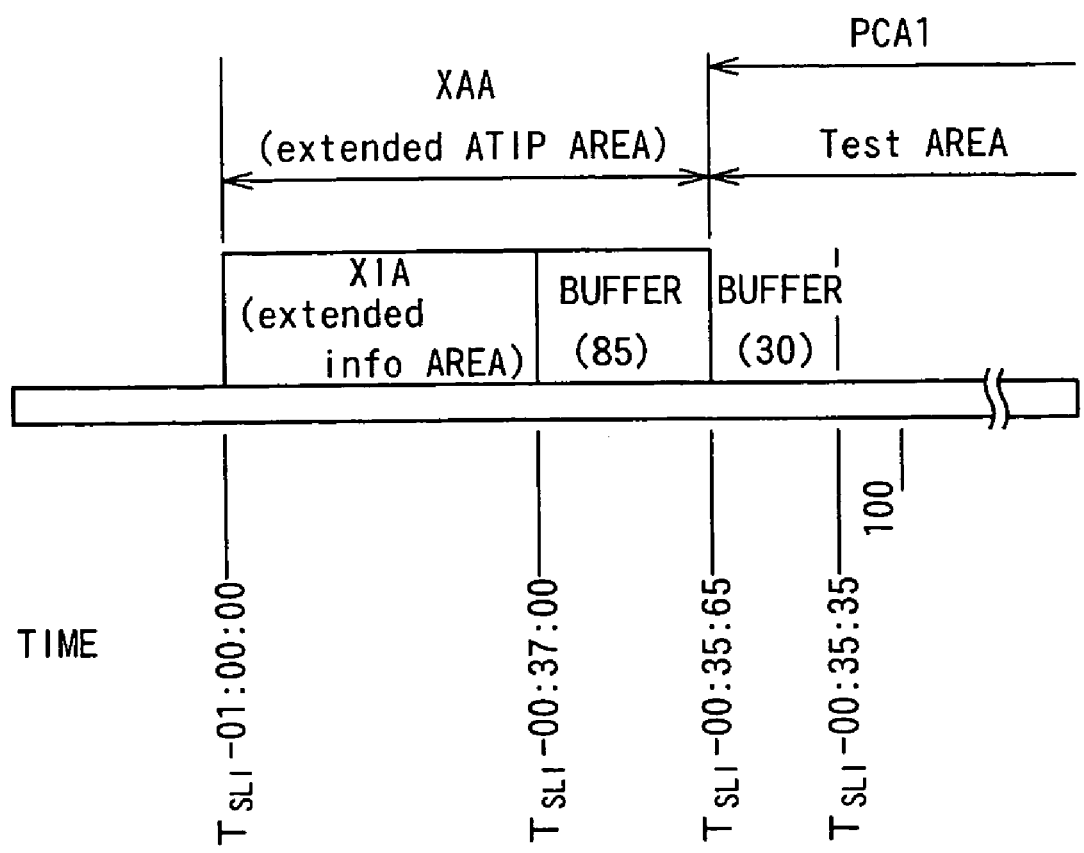
FIG. 7 is a view showing format of XAA of the optical disc.

The format of XAA is shown in FIG. 7.

The XAA is formed by XIA (extended Information Area), and buffer area. In the XIA, there are recorded additional information such as coloring matter information of the recording layer, disc maker ID which has manufactured the CD-R and/or initial value of recording power, etc. The start time of XIA is $T_{SLI}$−01:00:00. End time of XIA (start time of the buffer area) is $T_{SLI}$−00:37:00. The end time of the buffer area is $T_{SLI}$−00:35:65.

Figure 8:
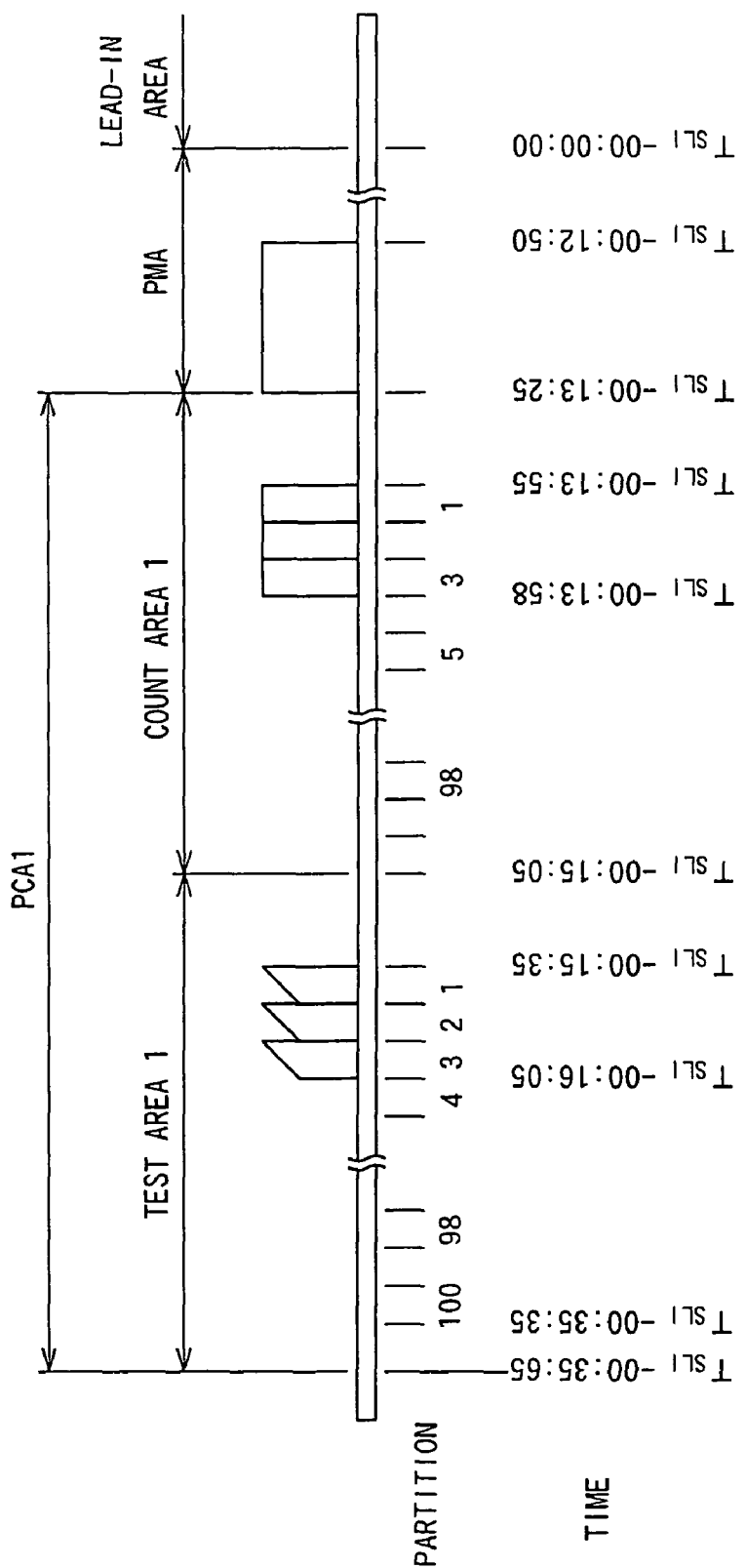
FIG. 8 is a view showing format of the inner circumferential side PCA and PMA of the optical disc.

The format of the inner circumferential side PCA and PMA is shown in FIG. 8.

The inner circumferential side PCA (PCA1) is formed by inner circumferential side test area (test area 1) and inner circumferential side count area (count area 1). The inner circumferential side test area is the area where trial write data is written. The inner circumferential count area is the area for identifying trially written partition within the inner circumferential side test area. The inner circumferential side test area and the inner circumferential side count area are respectively divided into 100 partitions. In the inner circumferential test area, trial write operation is performed on the partition basis. In addition, in the inner circumferential side count area, EFM data is written with respect to partition corresponding to the trially written partition. The start time of the inner circumferential side test area is $T_{SLI}$−00:35:65. The end time of the inner circumferential side test area (start time of count area) is $T_{SLI}$−00:15:05. The end time of the inner circumferential side count area is $T_{SLI}$−00:13:25.

The PMA is formed by area where address information required at the time of write-once operation of data is recorded and margin area. The start time of the PMA is $T_{SLI}$−00:13:25. The start time of the margin area is $T_{SLI}$−00:12:50.

Figure 9:
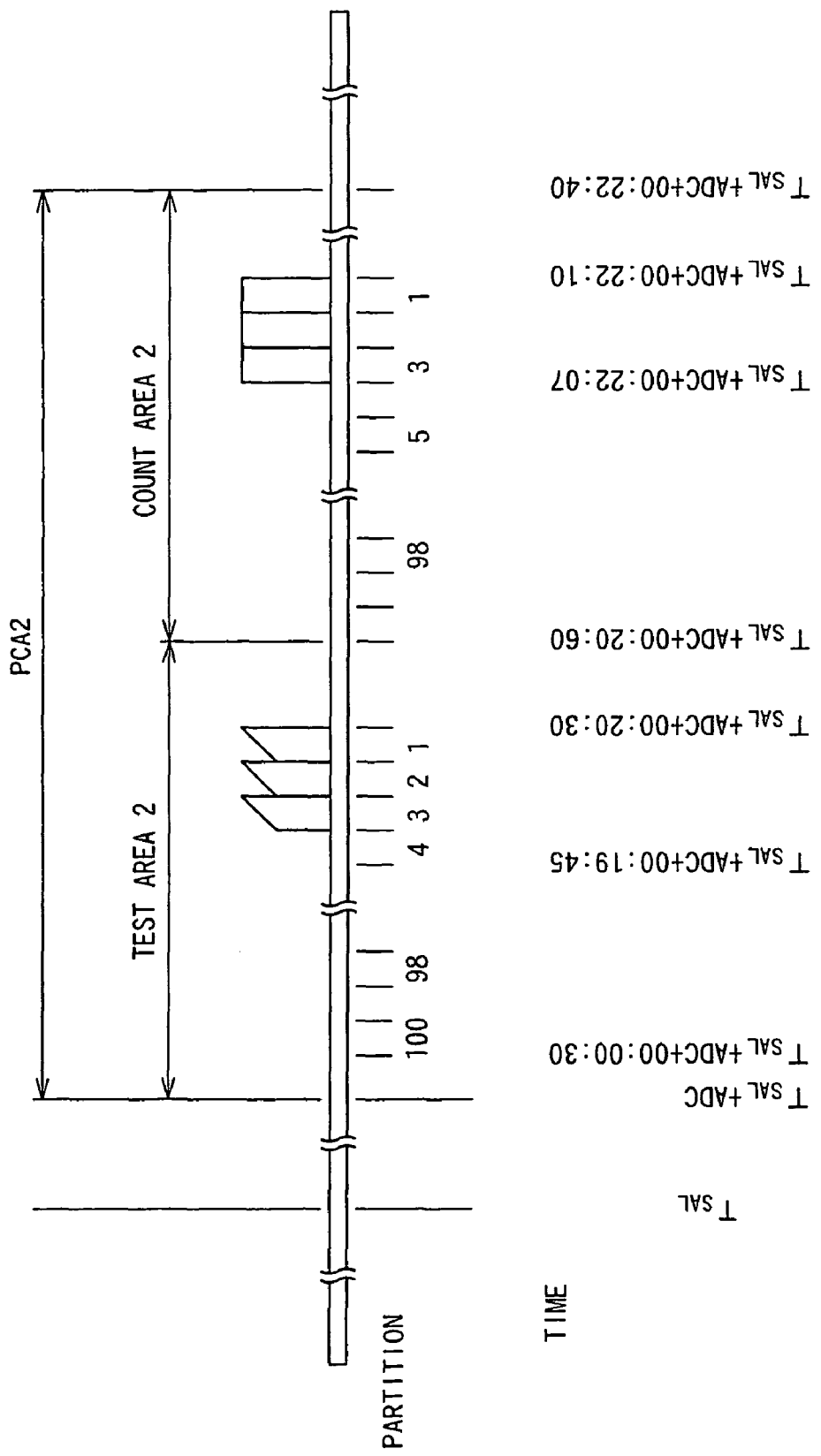
FIG. 9 is a view showing format of the outer circumferential side PCA of the optical disc.

The format of the outer circumferential side PCA portion is shown in FIG. 9.

The outer circumferential side PCA (PCA2) is formed by outer circumferential side test area (test area 2) and outer circumferential side count area (count area 2). The outer circumferential side teats area is the area where trial write data is written. The outer circumferential side count area is the area for identifying trially written partition within the outer circumferential side test area. The outer circumferential side test area and the outer circumferential side count area are respectively divided into 100 partitions. In the outer circumferential side test area, trial write operation is performed on the partition basis. In the outer circumferential side count area, EFM data is written with respect to partition corresponding to the trially written partition. The start time of the outer circumferential side test area is $T_{SAL}$+ADC. In this case, ADC is time corresponding to capacity of additional information recorded in the additional capacity area. The end time of the outer circumferential side test area (start time of count area) is $T_{SAL}$+ADC+00:20:60. The end time of the outer circumferential side count area is $T_{SAL}$+ADC+00:22:40.

As stated above, in the optical disc 1 according to the present invention, outer circumferential side PCA which is not formed in the conventional CD-R is provided. Namely, in the optical disc 1 according to the present invention, PCAs which are trial write areas for adjusting recording power of laser beams are provided at both sides of inner circumferential side and outer circumferential side in the state where program area is put therebetween.

In the optical disc 1 according to the present invention, since PCAs are provided at both sides of the inner circumferential side and the outer circumferential side in this way, one PCA near from the recording position of data is selected in recording data, thus making it possible to perform trial write operation. For this reason, in the optical disc 1 according to the present invention, even in the case where data are recorded at the outer circumferential side of the program area, it is possible to write trial write data at the outer circumferential side PCA to calculate recording power. Accordingly, distance between recording position of actual data and position where trial write data is to be written becomes short, thus making it possible to reduce error between recording power determined by PCA and optimum recording power at data write position. Further, if one PCA near from recording position of data is selected to perform trial write operation, distance between data recording position and PCA can be reduced. For this reason, seek time in trial write operation can be shortened.

In the optical disc 1 according to the present invention, since PCAs are provided at both sides of the inner circumferential side and the outer circumferential side in this way, it becomes possible to perform trial write operation with respect to two PCAs of the inner circumferential side and the outer circumferential side in reading data. For this reason, it is possible to determine, by interpoltion, on the basis of a pre-determined function, recording power every radius position (address) of the disc from the recording power which has determined from PCAs of both sides of the inner circumferential side and the outer circumferential side. Accordingly, even in the case where recording sensitivity with respect to position (address) in the radial direction changes resulting from mechanical characteristic such as skew or plane deviation, or coating unevenness of organic coloring matter, etc., data can be recorded by recording power close to the optimum recording power at the data write position.

The optical disc 1 according to the present invention has the same configuration as the conventional CD-R shown in Orange Book Part2, Vol.1, Ver3.1 and Orange Book Part2, Vol.2, Ver1.0 except for areas of the outer circumferential side PCA and the additional capacity. Accordingly, it becomes possible to record data onto the optical disc 1 by using the conventional CD-R drive. It is to be noted that in the case where data are recorded onto the optical disc 1 by using the conventional CD-R drive, trial write operation is performed only in the PCA of the inner circumferential side.

In the optical disc 1 according to the present invention, identification information for performing identification between the conventional CD-R shown in Orange Book Part2, Vol.1, Ver3.1 and Orange Book Part2, Vol.2, Ver1.0 and this disc is included in ATIP. In practical sense, that identification information is recorded at H1 to H4 (Highest Test Speed) of "Additional Information 1" within ATIP. For example, there is recorded identification information in which in the case where bits from H1 to H4 are "0111", "1000", "1001", "1010" and "1011", corresponding optical disc is optical disc 1 where the outer circumferential side PCA exists, and in the case where those bits are bits except for the above, corresponding optical disc is the conventional CD-R where the outer circumferential side PCA does not exist. When there is employed such an approach to record identification information in the ATIP in this way, even in the case where conventional CD-R where the outer circumferential side PCA is not provided is loaded with respect to the drive (unit), it becomes possible to prevent that trial write operation is erroneously performed at position corresponding to the outer circumferential side PCA.

It is to be noted that while explanation has been given above by taking example where the present invention is applied to optical disc where two trial write areas of the inner circumferential side PCA and the outer circumferential side PCA are formed as practical example of the present invention, not only such two trial write areas but also three trial write areas or more may be formed in the optical disc according to the present invention. The trial write area may be inserted into program area where data are to be recorded without being limited to the inner circumferential side or the outer circumferential side.

While explanation has been given by taking the example of the optical disc of the write-once type as optical disc to which the present invention is applied, the present invention can be applied also to any optical disc where trial write area for adjustment of recording power is formed, such as, for example, phase change disc. For example, the outer circumferential side PCA may be provided at CD-RW.

The present invention may be applied also to an optical disc in which two recording layers or more are formed. In this case, it is sufficient to form at least two trial write areas or more with respect to respective layers. In addition, kind of media is not limited to medium of the CD type having capacity of 680 MB, but may be applied to DVD or optical card of GB unit, etc.

<Optical Disc Recording/Reproducing Apparatus>

Then, an optical disc recording/reproducing apparatus adapted for recording data onto optical disc to which the present invention has been applied will be explained.

Figure 10:
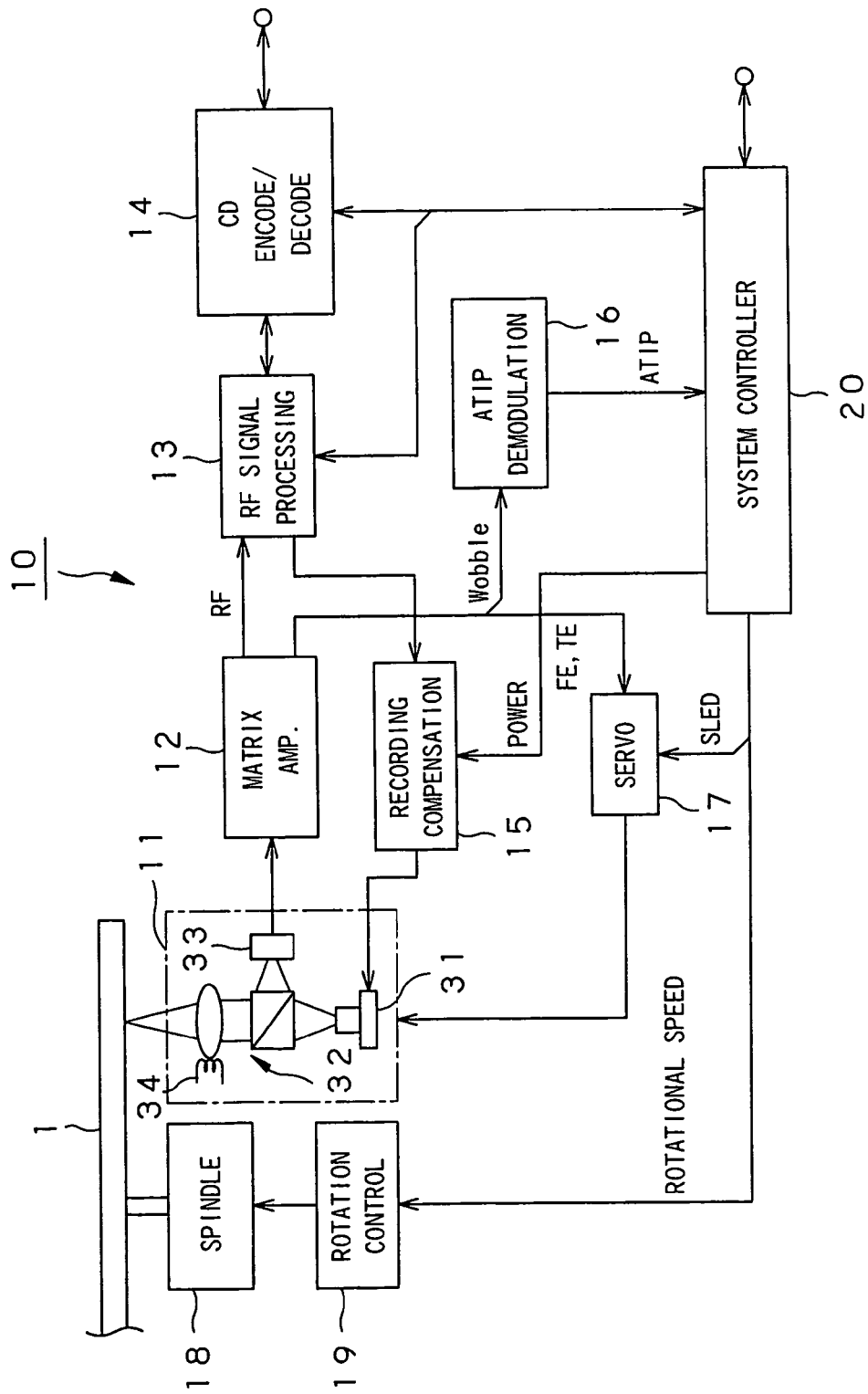
FIG. 10 is a block diagram showing a recording/reproducing apparatus for optical disc to which the present invention is applied.

The optical disc recording/reproducing apparatus 10 comprises, as shown in FIG. 10, an optical head 11, a matrix amplifier 12, a RF signal processing circuit 13, a CD encode/decode circuit 14, a recording compensation circuit 15, an ATIP demodulation circuit 16, a servo circuit 17, a spindle motor 18, a rotation control circuit 19, and a system controller 20.

The optical head 11 comprises a laser diode 31 used as light source, an optical system 32 for guiding laser beams emitted from the laser diode 31 onto object lens, a photo-detector 33 for detecting return laser beams reflected from the optical disc, and a biaxial actuator 34 including object lens for converging laser beams onto the optical disc to irradiate them, etc. The optical head 11 irradiates laser beams emitted from the laser diode 31 onto recording tracks of the optical disc through the optical system 32 and the object lens to detect, by using the photo-detector 33, return light from the optical disc of the irradiated laser beams. The biaxial actuator 34 of the optical head 11 allows the object lens to undergo displacement drive so that laser beams converged by the object lens and irradiated onto the optical disc are caused to be in focus state with respect to the signal recording surface of the optical disc, and are positioned on the recording tracks of the optical disc. This optical head 11 is supported within the apparatus casing through sled mechanism. The sled mechanism uses, e.g., rail in which the disc radius direction is caused to be travelling direction to have ability to move the optical head 11 in the radial direction of the optical disc.

The matrix amplifier 12 converts detection signal from the photo-detector 33 into voltage value to generate reproduction (RF) signal, focus error (FE) signal, tracking error (TE) signal and wobble signal. The RF signal is a signal in which information recorded on the optical disc is included. The FE signal is a signal in which there is included focus error quantity information indicating deviation of focus position of laser beams in disc vertical direction with respect to the recording layer of the optical disc. The TE signal is a signal in which there is included tracking error quantity information indicating deviation of irradiation position of laser spots in the disc radius direction with respect to the center of recording tracks of the optical disc. The wobble signal is a signal in which address information included in meandering component of pre-groove, etc. is included. This wobble signal is detected from difference signal of reflected light from both edges of the pre-grooves.

From such matrix amplifier 12, the RF signal is delivered to the RF signal processing circuit 13, and the FE signal and the TE signal are delivered to the servo circuit 17, and the wobble signal is delivered to the ATIP demodulation circuit 16.

At the time of reproduction, the RF signal processing circuit 13 performs waveform equalization processing, binarization processing and EFM demodulation processing, etc. with respect to the RF signal to reproduce data recorded on the optical disc. The reproduced data is delivered to the CD encode/decode circuit 14. In addition, at the time of recording, the RF signal processing circuit 13 performs EFM modulation processing, etc. with respect to recording data delivered from the CD encode/decode circuit 14 to deliver the recording data thus processed to the recording compensation circuit 15.

At the time of reproduction, the CD encode/decode circuit 14 performs error correction processing by using parity (8, C2) added to the reproduced data. The error-corrected data is sent to the external through interface (not shown), etc. In addition, at the time of recording, the CD encode/decode circuit 14 is supplied with recording data from the external through interface (not shown), etc. to add parity (8, C2) to the recording data to deliver it to the RF signal processing circuit 13.

The recording compensation circuit 15 is supplied with recording data from the RF signal processing circuit 13 to drive laser diode 31 in accordance with this recording data while conducting power control thereof to write recording data into the optical disc.

The ATIP demodulation circuit 16 is supplied with wobble signal from the matrix amplifier 12 to extract ATIP included in modulated component of the wobble signal. The ATIP demodulation circuit 16 delivers this ATIP to the system controller 20.

The servo circuit 17 drives biaxial actuator 34 of the optical head 11 on the basis of FE signal and TE signal which are delivered from the matrix amplifier 12 to conduct a control such that laser beams irradiated onto the optical disc are placed in the just focus state and the just track state. Namely, the servo circuit 17 moves the object lens so that the RF signal is caused to be equal to zero to conduct a control such that focus position of laser beams is in correspondence with the recording layer of the optical disc. The servo circuit 17 moves the object lens so that the TE signal is caused to be equal to zero to conduct a control such that laser spot irradiated onto the optical disc is in correspondence with the center of recording track. The servo circuit 17 drives the sled mechanism in accordance with sled control signal from the system controller 20 to move the optical head 11 in the disc radius direction.

The spindle motor 18 rotationally drives the optical disc held by, e.g., turn table or chucking mechanism.

The rotation control circuit 19 serves to perform drive control of the spindle motor 18 in accordance with control from the system controller 20.

The system controller 20 performs control of the entirety of the system such as control of start or stop of recording/reproduction, control for start and stop of respective servo circuits, and/or track jump control onto the target recording track, etc. The system controller 20 performs transmission/reception of control data to and from host computer, etc. to perform control of the entirety of the system as described above on the basis of this control data.

In addition, at the time of data recording, the system controller 20 performs control of power calibration (PCAL) which adjusts recording power of the laser diode 31. This power calibration will be conducted in a manner as described below.

First, the system controller 20 sets recording speed and initial value of power of laser beams corresponding to that recording speed. The recording speed is linear speed (velocity) for recording data. In the case of CLV recording, this linear speed (velocity) may be set as multiple with respect to ordinary recording speed such as 8 times speed, 16 times speed or 24 times speed. In the case of CLV recording, this linear speed (velocity) may be set to recording speed except for multiple such as 7.3 times speed, 14.5 times speed or 31.9 times speed. Subsequently, the system controller 20 writes trial write data, at linear speed (velocity) and initial power which have been set, with respect to trial write area (inner circumferential side PCA or outer circumferential side PCA) of the optical disc 1. Subsequently, the system controller 20 reads out that trial write data to detect parameters indicating recording and/or reproduction characteristics, e.g., error rate, jitter quantity and/or signal amplitude of that reproduction diode, etc. Subsequently, the parameters indicating the recording and/or reproducing characteristics are judged to judge whether or not power of laser beams is power suitable for performing recording operation. If corresponding power is power suitable for recording, power of laser beams at that time is set as recording power. Moreover, if corresponding power is power which is not suitable for recording, power of laser beams is changed to repeatedly perform the above-mentioned processing until power suitable for recording can be obtained.

The system controller 20 performs power calibration control as described above by using the inner circumferential side PCA or the outer circumferential side PCA to determine power of laser beams at the time of data recording.

<Setting Processing for Recording Power>

Then, practical setting method for recording power utilizing the inner circumferential side PCA and the outer circumferential side PCA will be explained by using the flowchart.

(First Setting Method)

Figure 11:
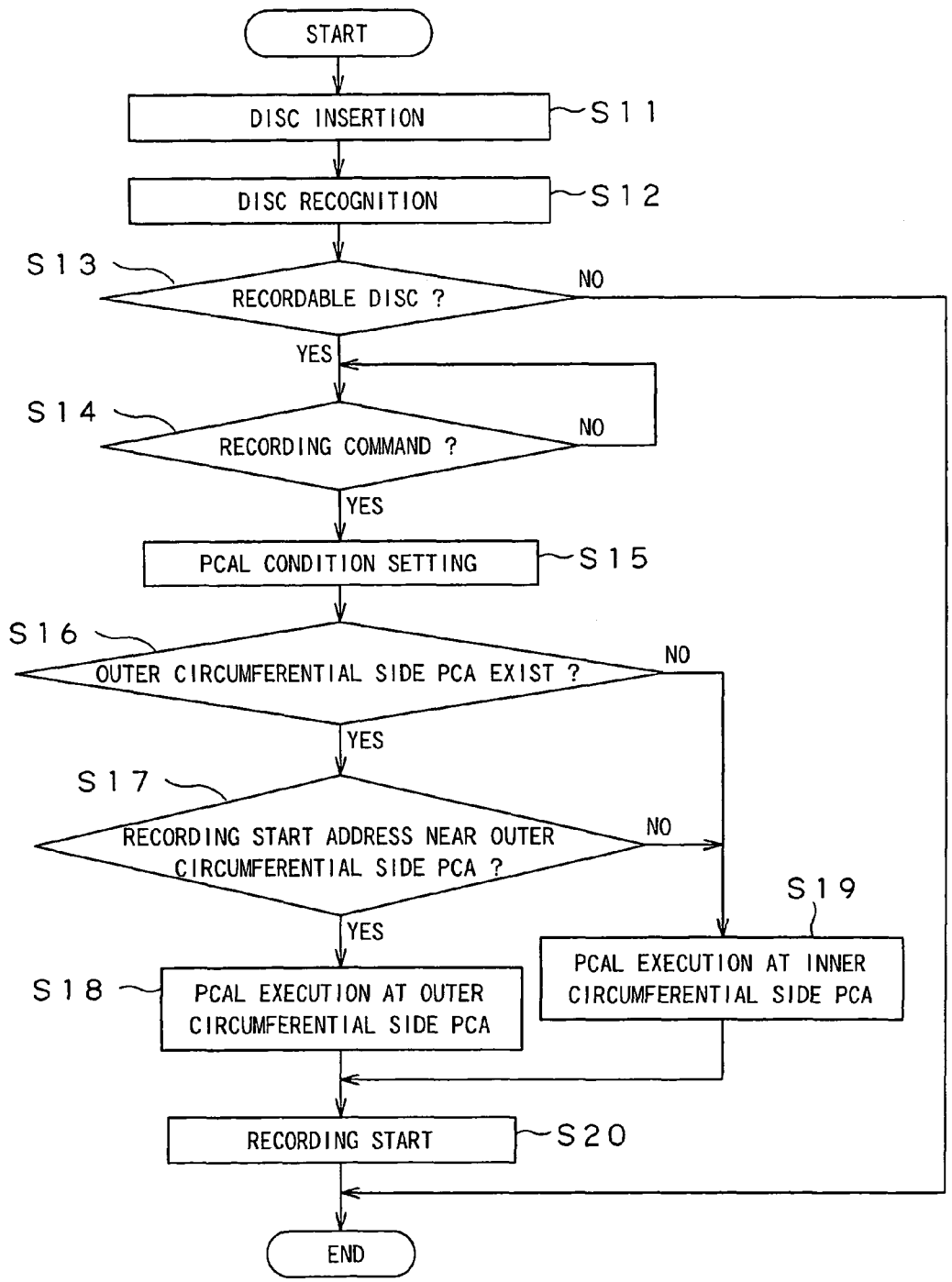
FIG. 11 is a flowchart showing first power calibration processing example of the recording/reproducing apparatus.

First, the first setting method will be explained with reference to the flowchart of FIG. 11.

When optical disc is loaded (step S11), the system controller 20 performs recognition of the loaded disc (step S12). The system controller 20 judges on the basis of the result that disc recognition has been performed whether the loaded disc is either recordable disc or reproduction (playback) only disc (step S13). The recordable disc is, e.g., CD-RW, CD-R or disc in which write-once operation of data can be made, etc. In the case where the system controller 20 has judged that the loaded disc is reproduction only disc, it completes the setting processing for recording power. In the case where the system controller 20 has judged that the loaded disc is recordable disc, it receives recording command from host computer, etc. (step S14).

Subsequently, the system controller 20 receives setting condition of PCAL such as recording speed (recording double speed) and/or recording system (TAO: Track At Once, DAO: Disc At Once, Packet Write), etc. (step S15).

Subsequently, the system controller 20 judges with reference to H1 to H4 of "Additional Information 1" of ATIP whether or not the outer circumferential side PCA exists at the loaded optical disc (step S16). In the case where it is judged that the outer circumferential side PCA exists, processing by the system controller 20 proceeds to step S17. In the case where it is judged that the outer circumferential side PCA does not exist, the processing by the system controller 20 proceeds to step S19.

Subsequently, in the case where it is judged that the outer circumferential side PCA exists, the system controller 20 judges whether recording start address is near the outer circumferential side PCA or is near the inner circumferential side PCA (step S17).

Subsequently, in the case where it is judged that recording start address is near the outer circumferential side PCA, the system controller 20 executes PCAL at the outer circumferential side PCA to calculate recording power (step S18).

Subsequently, in the case where it is judged that the recording start address is near the inner circumferential side PCA, or it is judged that the outer circumferential side PCA does not exist, the system controller 20 executes PCAL at the inner circumferential side PCA to calcualte recording power (step S19).

The system controller 20 sets recording power of laser beams to recording power calculated at either one of the inner circumferential side and the outer circumferential side to start recording operation of data (step S20).

As stated above, in the first setting method, one PCA near from recording start address is selected from two PCAs of the inner circumferential side PCA and the outer circumferential side PCA to perform trial write operation. For this reason, in the first setting method, even in the case where data is recorded at the outer circumferential side of the program area, trial write data is written at the outer circumferential side PCA to have ability to calculate recording power. Accordingly, distance between recording position of actual data and the position where trial write data is written is shortened. Thus, error between recording power determined by PCA and optimum recording power at write position can be reduced. Further, if one PCA near from recording position of data is selected to perform trial write operation, distance between data recording position and PCA can be shortened. For this reason, seek time in trial write operation can be shortened.

(Second Setting Method)

Figure 12:
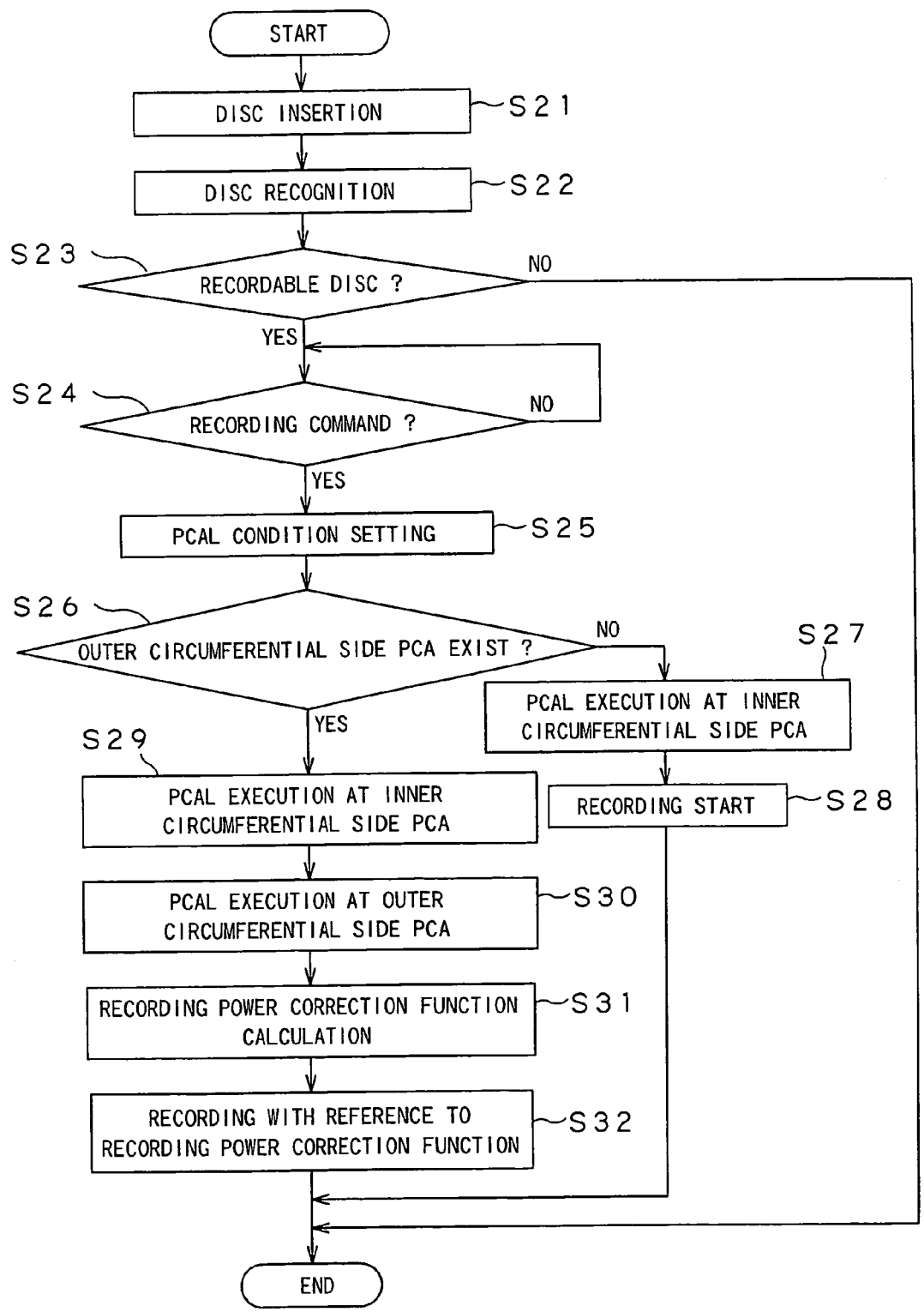
FIG. 12 is a flowchart showing second power calibration processing example of the recording/reproducing apparatus.

Then, the setting method will be explained with reference to the flowchart shown in FIG. 12.

When the optical disc is loaded (step S21), the system controller 20 performs recognition of the loaded disc (step S22). The system controller 20 judges on the basis of the result that disc recognition has been made whether the loaded disc is recordable disc or reproduction only disc (step S23). The recordable disc is, e.g., CD-RW, CD-R or disc in which write-once operation of data can be made, etc. In the case where the system controller 20 has judged that the loaded disc is reproduction only disc, it completes setting processing for recording power. In the case where the system controller 20 has judged that the loaded disc is recordable disc, it receives recording command from host computer, etc. (step S24).

Subsequently, the system controller 20 receives setting condition of PCAL such as recording speed (recording double speed) and/or recording system (TAO: Track At Once, DAO: Disc At Once, Packet Write), etc. (step S25).

Subsequently, the system controller 20 judges with reference to H1 to H4 of "Additional Information 1" of ATIP whether or not the outer circumferential side PCA exists at the loaded optical disc (step S26). In the case where it is judged that the outer circumferential side PCA exists, processing by the system controller 20 proceeds to step S29. In the case where it is judged that the outer circumferential side PCA does not exist, processing by the system controller 20 proceeds to step S27.

Subsequently, in the case where it is judged that the outer circumferential side PCA does not exist, the system controller 20 executes PCAL at the inner circumferential side PCA to calculate recording power (step S27) to set recording power of laser beams to recording power calculated at the inner circumferential side PCA to start recording operation of data (step S28).

On the other hand, in the case where it is judged that the outer circumferential side PCA exists, the system controller 20 executes PCAL at the inner circumferential side PCA to calculate recording power (step S29) therafter to execute PCAL at the outer circumferential side PCA to calcualte recording power (step S30). It is to be noted that processing order of the step S29 and the step S30 may be order where PCAL is performed from PCA nearer from recording position of data.

Subsequently, the system controller 20 calculates recording power correction function indicating recording power with respect to disc radius position (address) on the basis of recording power determined at the inner circumferential side PCA and recording power determined at the outer circumferential side PCA (step S31).

The system controller 20 records data on the basis of the recording power correction function while changing recording power in accordance with disc radius position (step S32).

Here, the method of calculating recording power correction function which is calculated at the step S31 will be explained.

The recording power correction function f(x) in the case of the CLV control system where recording speed (velocity) at the inner circumferential side and recording speed (velocity) at the outer circumferential side are the same will be calculated in a manner as described below.

Recording power determined by writing trial write data with respect to the inner circumferential side PCA at recording speed (velocity) v is assumed to be Power [inner_pca, v], and recording power determined by writing trial write data with respect to the outer circumferential side PCA at recording speed (velocity) v is assumed to be Power [outer_pca, v].

First, Power[inner_pca, v] and Power[outer_pca, v] are compared with each other.

In the case where Power [inner_pca, v]≈Power [outer_pca, v] holds as the result of comparison, recording power correction function f(x) in which recording power is constant at (Power [inner_pca, v]+Power [outer_pca, v]/2 with respect to the disc radius position (x) is generated.

Namely, in the case where Power [inner_pca, v]≈Power [outer_pca, v] holds, it is judged that there is no recording sensitivity difference between inner circumference and outer circumference. For example, as indicated by A in FIG. 13, data recording is performed onto the disc entire surface by average value of recording power determined at the inner circumferential side PCA and recording power determined at the outer circumferential side PCA.

In the case where |Power [inner_pca, v]|<<|Power [outer_pca, v]| or |Power [inner_pca, v]|>>|Power [outer_pca, v]| as the result of comparison, recording power from the outer circumferential side up to the inner circumferential side of the disc is interpolated by a predetermined function, e.g., line or quadratic curve, etc. on the basis of the relationship between radius positions of the inner circumferential side PCA and the outer circumferential side PCA and Power [inner_pca, v] and Power [outer_pca, v] to determine recording power correction function f(x).

Figure 13:
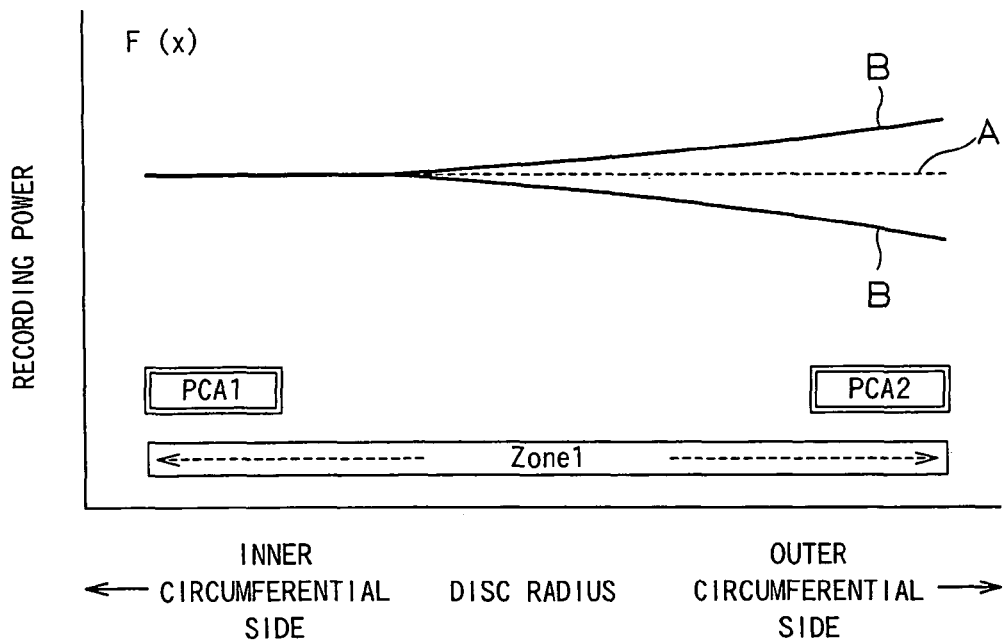
FIG. 13 is a view showing recording power correction function in the case of the CLV control system of performing calculation by the second power calibration processing.

Namely, in the case where Power [inner_pca, v]≈Power [outer_pca, v] does not hold, it is judged that there is recording sensitivity difference between inner circumference and outer circumference to record data while changing recording power in accordance with recording power correction function f(x) generated on the basis of quadratic function as indicated by B in FIG. 13, for example.

The recording power correction function in the case of the zone CLV control system where recording speed (velocity) at the inner circumferential side and that at the outer circumferential side are different from each other can be calculated in a manner as described below.

Here, the zone within the disc is divided into three zones (ZONE1, ZONE2, ZONE3), and explanation will be given by taking, as an example, the case where recording speeds (velocities) of respective zones are v1, v2, v3 (v1<v2<v3). In addition, in the ideal state where recording sensitivity is constant irrespective of disc radius position (x), the relationship between recording power of recording speed (velocity) v2 (Power[x, v2]) and recording power of recording speed (velocity) v3 (Power[x, v3]) with respect to recording power of recording speed (velocity) v1 (Power [x, v1]) is assumed to be the relationship as described below.

Power [x, v2]=WP_Coef_1×Power[x, v1]

Power [x, v3]=WP_Coef_2×Power[x, v2]= WP_Coef_2×WP_Coef_1×Power [x, v1]

First, recording power Power [inner_pca, v1] determined by writing trial write data at recording speed (velocity) v1 with respect to the inner circumferential side PCA and recording power Power [outer_pca, v3] determined by writing trial write data at recording speed (velocity) v3 with respect to the outer circumferential side PCA are compared with each other in consideration of correction coefficient (WP_Coef_2×WP_Coef_1) between recording speed (velocity) v1 and recording speed (velocity) v3.

In the case where WP_Coef_1×WP_Coef_2≈Power [inner_pca, v1]/Power [outer_pca, v3] holds, optimum recording power at speed (velocity ) v1 is calculated in a manner as described below.

Power [x, v1]={(Power [outer_pca, v3]/(WP_Coef_ 1×WP_Coef_2))+Power [inner_pca, v1]}/2

Subsequently, recording powers (Power [z1, v1], Power [z2, v2], Power [z3, v3]) with respect to respective zones are determined in a manner as described below on the basis of Power [x, v1].

Power [z1, v1]=Power [x, v1]

Power [z2, v2]=WP_Coef_1×Power [x, v1]

Power [z3, v3]=WP_Coef_2×WP_Coef_1×Power [x, v1]

Figure 14:
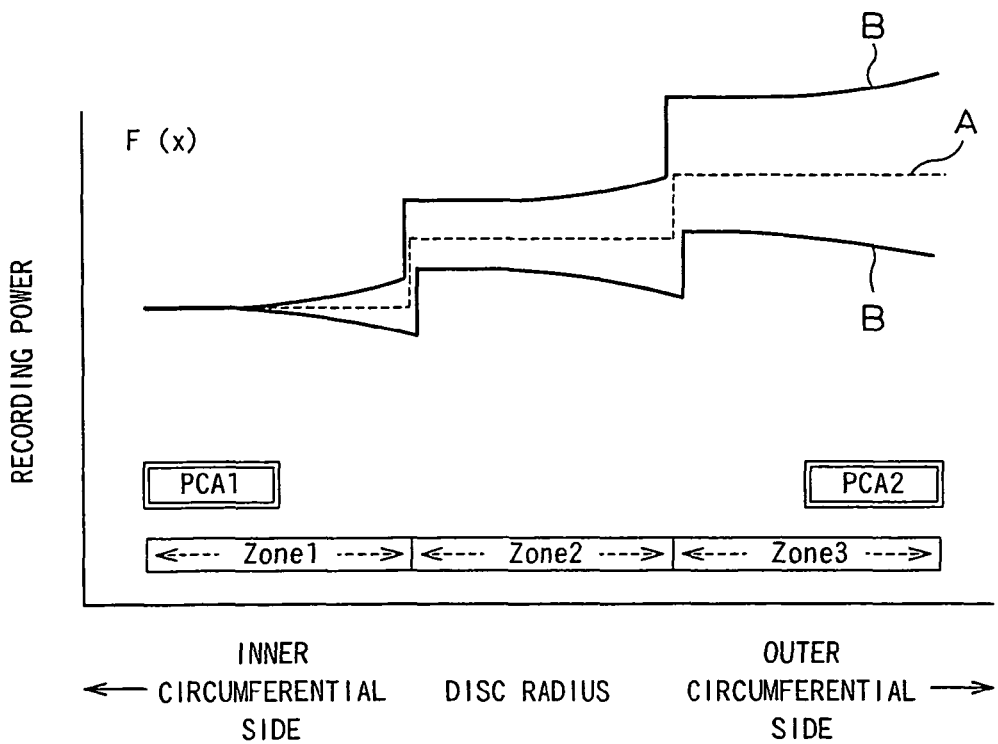
FIG. 14 is a view showing recording power correction function in the case of the zone CLV control system of performing calculation by third power calibration processing.

These recording powers are synthesize in the radial direction to determine recording power correction function f(x) in which recording powers at respective zones are constant at the Power [z1, v1], Power [z2, v2], Power [z3,v3]. Namely, in the case where WP_Coef_1×WP_Coef_2≈Power [inner_pca, v1]/Power [outer_pca, v3] holds, it is judged that there is no recording sensitivity difference between inner circumference and outer circumference. For example, as indicated by A in FIG. 14, data are recorded in accordance with recording power correction function f(x) which becomes constant every each zone.

In the case where WP_Coef_1×WP_Coef_2≈Power [inner_pca, v1]/Power [outer_pca, v3] does not hold as the result of the comparison, recording power in the case where recording is performed at constant recording speed (velocity) v1 from the outer circumferential side to the inner circumferential side of the disc on the basis of the relationship between radius positions of the inner circumferential side PCA and the outer circumferential side PCA and Power [inner_pca, v1] and (Power [outer_pca, v3]/WP_Coef_1×WP_Coef_2) is interpolated by a predetermined function, e.g., line or quadratic curve, etc. to determine recording power function f'(x) at recording speed (velocity) v1.

Subsequently, recording correction power functions fz1 (x), fz2(x), fz3(x) at respective zones are determined in a manner as described below from recording power correction functions f'(x) with respect to respective zones.

fz1(x)=f'(x)

fz2=WP_Coef_1×f'(x)

fz3=WP_Coef_2×WP_Coef_1×f'(x)

These respective functions are synthesized to generate recording power correction function f(x) in which recording powers in respective zones are the fz1(x), fz2(x), fz3(x). Namely, in the case where Power [inner_pca, v]≈Power [outer_pca, v] does not hold, it is judged that there is recording sensitivity difference between inner circumference and outer circumference. Thus, data are recorded while changing recording power in accordance with recording power correction function f(x) generated on the basis of quadratic function as indicated by B in FIG. 14, for example.

As stated above, in the second setting method, trial write operation is performed with respect to two PCAs of the inner circumferential side and the outer circumferential side to determine, by interpolation, on the basis of a predetermined function, recording powers every radius position (address) of the disc from recording power determined from both PCAs of the inner circumferential side and the outer circumferential side. Accordingly, even in the case where recording sensitivity with respect to the disc radius position (address) changes resulting from, e.g., mechanical characteristic such as skew or plane deviation and/or coating unevenness of organic coloring matter, etc., data can be recorded by recording power close to the optimum recording power at data write position. Thus, setting accuracy of recording power is improved. As a result, it is possible to record data having less noise and good reproduction characteristic.

(Third Setting Method)

Figure 15:
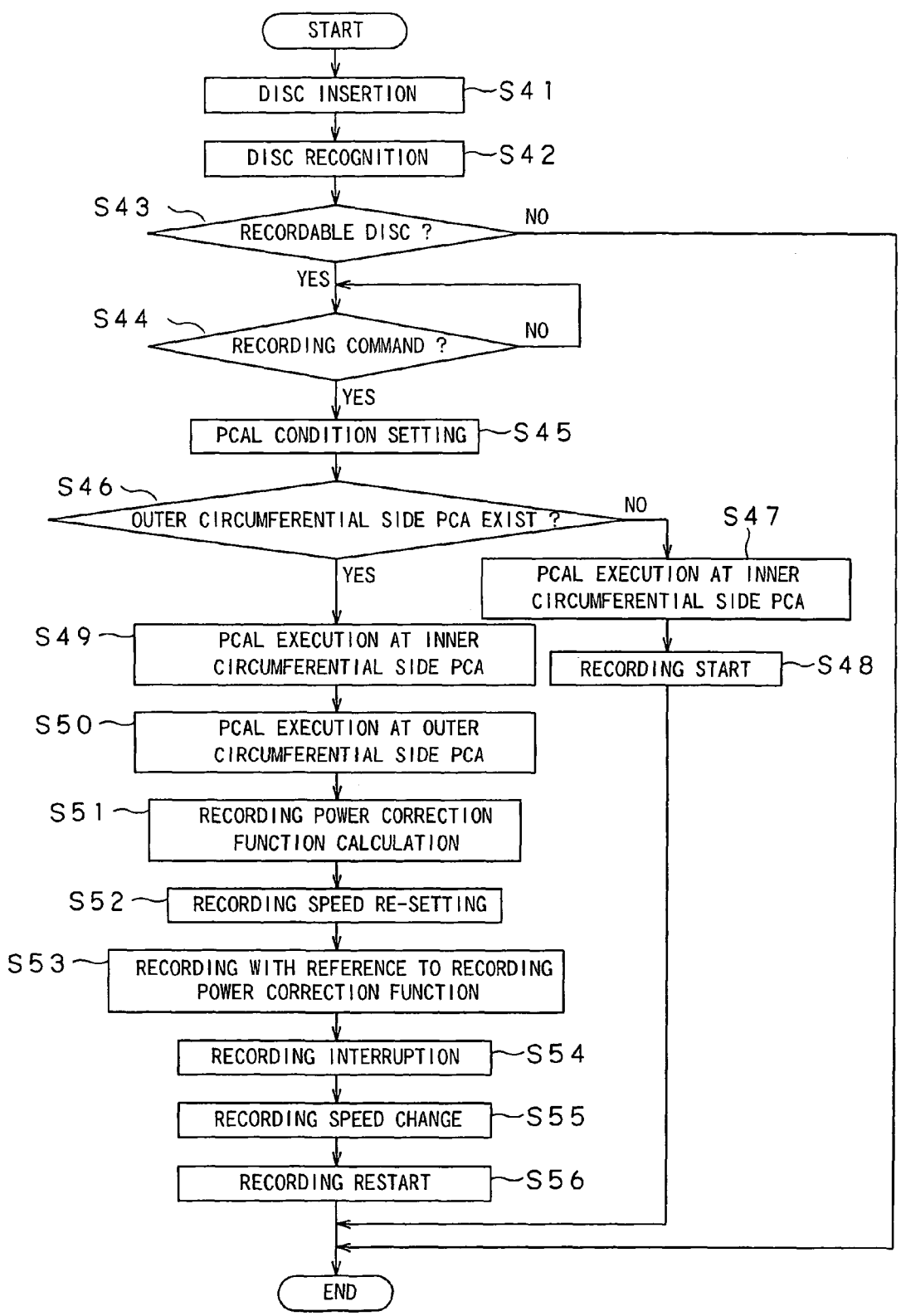
FIG. 15 is a flowchart showing the third power calibration processing example of the recording/reproducing apparatus.

Then, third setting method will be explained with reference to the flowchart shown in FIG. 15.

When the optical disc is loaded (step S41), the system controller 20 performs recognition of the loaded disc (step S42). The system controller 20 judges on the basis of the result that disc recognition has been made whether the loaded disc is recordable disc or reproduction only disc (step S43). The recordable disc is, e.g., CD-RW, CD-R or disc in which write-once operation of data can be made, etc. In the case where the system controller 20 has judged that the loaded disc is reproduction only disc, it completes the setting processing for recording power. In the case where the system controller 20 has judged that the loaded disc is recordable disc, it receivers recording command from host computer, etc. (step S44).

Subsequently, the system controller 20 receives setting condition of PCAL such as recording speed (recording double speed) and/or recording system (TAO: Track At Once, DAO: Disc At Once, Packet Write), etc. from host computer, etc. (step S45).

Subsequently, the system controller 20 judges with reference to H1 to H4 of "Additional Information 1" of ATIP whether or not the outer circumferential side PCA exists in the loaded optical disc (step S46). In the case where it is judged that the outer circumferential side PCA exists, processing by the system controller 20 proceeds to step S49. In the case where it is judged that the outer circumferential side PCA does not exist, processing by the system controller 20 proceeds to step S47.

Subsequently, in the case where it is judged that the outer circumferential side PCA does not exist, the system controller 20 executes PCAL at the inner circumferential side PCA to calculate recording power (step S47) to set recording power of laser beams to recording power calculated at the inner circumferential side PCA to start recording operation of data (step S48).

On the other hand, in the case where it is judged that the outer circumferential side PCA exists, the system controller 20 executes PCAL at the inner circumferential side PCA to calcualte recording power (step S49) thereafter to execute PCAL at the outer circumferential side PCA to calcualte recording power (step S50). It is to be noted that processing order of the step S49 and the step S50 may be order in which PCAL is performed from PCA nearer from recording position of data.

Subsequently, the system controller 20 calculates recording power correction function indicating recording power with respect to disc radius position (address) on the basis of recording power determined at the inner circumferential side PCA and recording power determined at the outer circumferential side PCA (step S51). The method of calculating the recording power correction function is the same as the second setting method.

Subsequently, the system controller 20 is operative so that in the case where recording power which is set by the recording power correction function is larger than a predetermined threshold value (e.g., maximum recording power that laser diode 31 can output), it changes setting condition of the recording speed given from the host computer to allow the setting condition to be the condition where speed (velocity) is caused to be low to calculate recording power correction function for a second time (step S52). For example, in the zone CLV system, recording speed at the outer circumferential side is higher than that at the inner circumferential side. Followed by this, recording power also becomes large. This is because there is the possibility that recording power in the zone of the outer circumferential side may be set to recording power of rated value of laser diode or more.

Subsequently, the system controller 20 starts recording operation of data while making reference to recording power correction function under the speed (velocity) condition initially given from the host computer (step S53).

Subsequently, when the system controller 20 performs recording operation until the position where recording power is above a predetermined threshold value, it interrupts recording operation of data (step S54).

Subsequently, the system controller 20 changes recording speed (velocity) and recording power correction function into quantities under the reset condition (step S55) to restart recording operation (step S56).

As stated above, in the third setting method, trial write operation is performed with respect to two PCAs of the inner circumferential side and the outer circumferential side to determine, by interpolation, on the basis of a predetermined function, recording powers every radius position (address) of the disc from recording powers determined from both PCAs of the inner circumferential side and the outer circumferential side. In addition, in the third setting method, in the case where recording power determined from interpolation result is larger than a predetermined threshold value, data are recorded at the recording position where the recording power is a recording power larger than the predetermined threshold value in the state where recording speed (velocity) is caused to be low. For this reason, e.g., even in the case where high speed recording cannot be realized because the recording sensitivity is low such as the case of the zone CLV system, there may be conducted a processing to perform recording operation in the state where recording speed at the inner circumferential side remains to be rated double speed and to only lower recording speed (velocity) of the area of the outer circumferential side without performing recording operation in the state where recording speed is caused to be uniformly low from the inner circumference to the outer circumference.

(Forth setting method)

Figure 16:
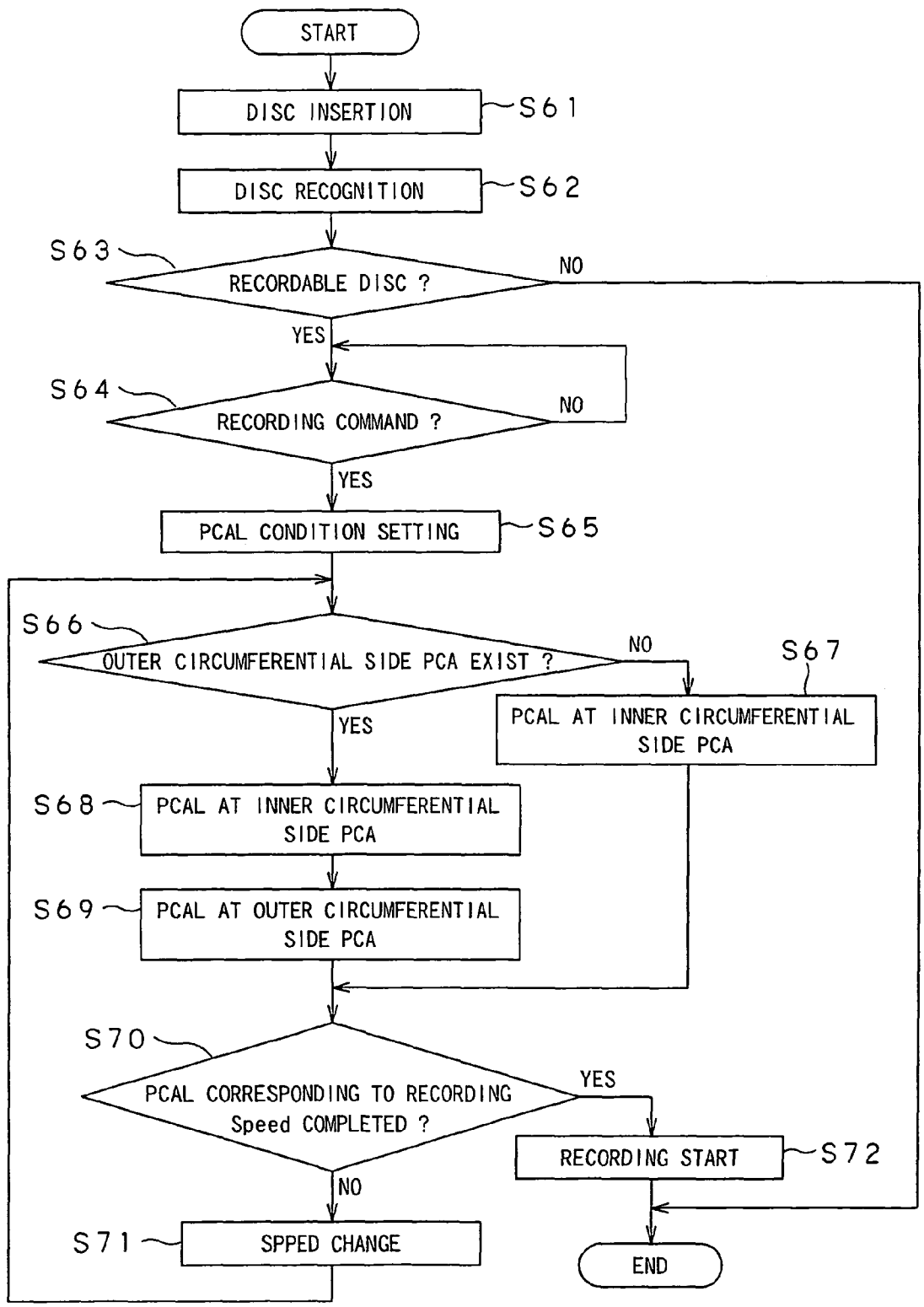
FIG. 16 is a flowchart showing fourth power calibration processing example of the recording/reproducing apparatus.

Then, the fourth setting method will be explained with reference to the flowchart shown in FIG. 16.

When the optical disc is loaded (step S61), the system controller 20 performs recognition of the loaded disc (step S62). The system controller 20 judges on the basis of the result that disc recognition has been made whether the loaded disc is recordable disc or reproduction only disc (step S63). The recordable disc is, e.g., CD-RW, CD-R or disc in which write-once operation of data can be made, etc. In the case where the system controller 20 has judged that the loaded disc is reproduction only disc, it completes the setting processing for recording power. In the case where the system controller 20 has judged that the loaded disc is recordable disc, it receives recording command from host computer, etc. (step S64).

Subsequently, the system controller 20 receives setting condition of PCAL such as recording speed (recording double speed) and/or recording system (TAO: Track At Once, DAO: Disc At Once, Packet Write), etc. (step S65).

Subsequently, the system controller 20 judges with reference to H1 to H4 of "Additional Information 1" of ATIP whether or not the outer circumferential side PCA exists in the loaded optical disc (step S66). In the case where it is judged that the outer circumferential side PCA exists, processing by the system controller 20 proceeds to step S68. In the case where it is judged that the outer circumferential side PCA does not exist, processing by the system controller 20 proceeds to step S67.

Subsequently, in the case where it is judged that the outer circumferential side PCA does not exist, the system controller 20 executes PCAL at the inner circumferential side PCA to calculate recording power (step S67).

On the other hand, in the case where it is judged that the outer circumferential side PCA exists, the system controller 20 executes PCAL at the inner circumferential side PCA to calculate recording power (step S68) thereafter to execute PCAL at the outer circumferential side PCA to calculate recording power (step S69). It is to be noted that recording order of the step S68 and the step S69 may be order in which PCAL is performed from PCA nearer from recording position of data.

Subsequently, when PCAL is completed, the system controller 20 judges whether or not PCAL corresponding to recording speed has been completed (step S70). For example, in the case of 24 times speed zone CLV system, recording speed such as 12 times speed, 16 times speed, 20 times speed or 24 times speed is generally used so that recording is performed within the disc surface. For this reason, here, recording speed of trial write data recorded into PCA is also actually changed into 12 times speed, 16 times speed, 20 times speed or 24 times speed. For this reason, at this step S70, whether or not PCAL operations of all recording speeds are completed is judged. If PCAL has been completed with respect to all recording speeds, processing proceeds to step S72 to start recording operation. Moreover, if PCAL has not yet been completed with respect to all recording speeds, recording speed of PCAL is changed at step S71 to repeat processing from the step S66.

As stated above, in the fourth setting method, trial write operation is performed with respect to two PCAs of the inner circumferential side and the outer circumferential side to determine, by interporation, on the basis of a predetermined function, recording power every radius position (address) of the disc from recording powers determined from both PCAs of the inner circumferential side and the outer circumferential side. In addition, in the fourth setting method, e.g., in the case of the zone CLV system, recording speed of trial write data recorded into the PCA is set to actual recording speed to perform PCAL. For this reason, it is possible to calculate more precise recording power.

While explanation has been given above in connection with the first to fourth embodiments, the above-mentioned processing is performed not only at the time of starting data recording, but also may be performed in the state where the processing is interrupted during recording.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth and defined by appended claims.

INDUSTRIAL APPLICABILITY

In the optical recording medium according to the present invention, trial write operation for adjusting recording power of laser beams is performed within the trial write area nearest from the recording position of data, or trial write operation for adjusting recording power of laser beams are performed within two trial write areas or more. For this reason, data can be recorded by optimum laser power even at any recording position. Thus, the recording characteristic can be improved. In this optical recording medium, trial write operation is performed within the trial write area nearest from recording position of data, thereby making it possible to shorten time until recording start.

In the recording apparatus and the recording method according to the present invention, in recording data with respect to optical recording medium including data recording area where laser beams are irradiated so that data is written, and plural trial write areas where trial write data for adjustment of recording power of laser beams is written, trial write operation for adjusting recording power of laser beams is performed within the trial write area nearest from the recording position of data. Accordingly, data can be recorded by the optimum laser power even at any recording position on the recording medium. Thus, the recording characteristic can be improved and time up to recording start can be shortened.

In the recording apparatus and the recording method according to the present invention, in recording data with respect to optical recording medium including data recording area where laser beams are irradiated so that data is written and plural trial write areas where trial write data for adjustment of recording power of laser beams is written, trial write operation for adjusting recording power of laser beams is performed within two trial write areas or more. Accordingly, data can be recorded by optimum laser power even at any recording position on the recording medium. Thus, the recording characteristic can be improved.

The invention claimed is:

1. A recording apparatus comprising:
   recording means for irradiating laser beams onto an optical recording medium including, at least, a data recording area where laser beams are irradiated so that data is written, and first, second, and third trial write areas where trial write data for adjusting a write power of the laser beams is written; and
   control means for controlling the recording means to write the trial write data onto one of the first, second, and third trial write areas having a smallest calculated physical distance to a recording start position on the optical recording medium, and changing, after the recording means starts to write the data in the data recording area, a speed for writing the data to be lower than a speed set in advance to write the data, when the write power of the laser beams in the data recording area is larger than a predetermined value.

2. The recording apparatus as set forth in claim 1, wherein the control means sets the write power of the laser beams irradiated onto the data recording area of the optical recording medium on the basis of the trial write data read out from the one of the first, second, or third trial write areas.

3. The recording apparatus as set forth in claim 1, wherein the predetermined value is a rated value of a laser diode which outputs the laser beams.

4. The recording apparatus as set forth in claim 1, wherein the optical recording medium further comprises a lead-in area arranged at an inner circumferential side of the data recording area where a table of contents for the written data is written and a lead-out area arranged at an outer circumferential side of the data recording area,
   the first trial write area is arranged at an inner circumferential side of the lead-in area, and
   the second trial write area is arranged at an outer circumferential side of the lead-out area.

5. A recording method comprising steps of:
   irradiating laser beams onto an optical recording medium in a data recording area so that data is written, the optical recording medium comprising first, second, and third trial write areas where trial write data for adjusting a write power of the laser beams is written;
   writing the trial write data onto one of the first, second, and third trial write areas having a smallest calculated physical distance to a recording start position on the optical recording medium; and
   changing, after starting the irradiating laser beams onto the optical recording medium in the data recording area so that the data is written, a speed for writing the data to be lower than a speed set in advance to write the data, when the write power of the laser beams in the data recording area is larger than a predetermined value.

6. The recording method as set forth in claim 5, further comprising:
   setting the write power of the laser beams irradiated onto the data recording area of the optical recording medium on the basis of the trial write data read out from the one of the first, second, and third trial write areas.

7. The recording method as set forth in claim 5, wherein the predetermined value is a rated value of a laser diode which outputs the laser beams.

8. The recording method as set forth in claim 5, wherein the optical recording medium further comprises a lead-in area arranged at an inner circumferential side of the data recording area where a table of contents for the written data is written and a lead-out area arranged at an outer circumferential side of the data recording area, the first trial write area is arranged at an inner circumferential side of the lead-in area, and
the second trial write area is arranged at an outer circumferential side of the lead-out area.

* * * * *